(12) United States Patent
Bodin et al.

(10) Patent No.: US 7,673,464 B2
(45) Date of Patent: Mar. 9, 2010

(54) METHOD AND APPARATUS FOR TEMPERATURE BASED PLACEMENT OF AN ITEM WITHIN A STORAGE UNIT

(75) Inventors: William Kress Bodin, Austin, TX (US); Michael Lee Masterson, Cedar Park, TX (US); Stephen James Watt, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 11/467,187

(22) Filed: Aug. 25, 2006

(65) Prior Publication Data

US 2008/0047282 A1 Feb. 28, 2008

(51) Int. Cl.
*F25B 49/00* (2006.01)

(52) U.S. Cl. .............. 62/127; 62/125; 62/129; 62/441; 347/141; 347/166; 702/130

(58) Field of Classification Search .............. 62/125, 62/127, 129, 441; 162/205; 236/51; 705/28; 702/128, 129, 130, 132, 133, 134, 135, 136, 702/173; 700/299, 300; 374/141, 166
See application file for complete search history.

(56) References Cited

U.S. PATENT DOCUMENTS

| | | |
|---|---|---|
| 4,093,032 A | 6/1978 | Uyama et al. |
| 4,563,739 A | 1/1986 | Gerpheide et al. |
| 4,627,504 A | 12/1986 | Moran |
| 4,964,053 A | 10/1990 | Humble |
| 5,335,509 A | 8/1994 | Namisniak et al. |
| 5,418,334 A | 5/1995 | Williams |
| 5,487,276 A | 1/1996 | Namisniak et al. |
| 5,711,160 A | 1/1998 | Namisniak et al. |
| 5,726,880 A | 3/1998 | Bailey et al. |
| 5,920,261 A | 7/1999 | Hughes et al. |
| 6,089,498 A | 7/2000 | Sticht |
| 6,101,826 A | 8/2000 | Bessler |
| 6,158,381 A | 12/2000 | Bray |

(Continued)

FOREIGN PATENT DOCUMENTS

WO WO 2005/015510 A1 * 2/2005

(Continued)

OTHER PUBLICATIONS

Scher, "RFID Shelf Antennas Featuring Dynasys de-Q Tuning", pp. 1-7, retrieved May, 30, 2006 http://rfidusa.com/superstore/product_info.php?cPath=21_39_60&products_id=223.

(Continued)

*Primary Examiner*—Frantz F Jules
*Assistant Examiner*—Daniel C Comings
(74) *Attorney, Agent, or Firm*—Yee & Associates, P.C.; William H. Steinberg

(57) ABSTRACT

A method, apparatus, and computer usable program product for identifying an optimal placement of an item within a storage unit. The process identifies an item for placement in the storage unit. The process determines a preferred storage temperature range for the identified item. The process then selects an optimal placement location within the storage unit for the identified item based on the preferred storage temperature range and a set of temperature readings for the storage unit.

20 Claims, 6 Drawing Sheets

U.S. PATENT DOCUMENTS

| | | | |
|---|---|---|---|
| 6,327,576 B1 | 12/2001 | Ogasawara | |
| 6,393,848 B2 | 5/2002 | Roh et al. | |
| 6,453,687 B2 | 9/2002 | Sharood et al. | |
| 6,481,602 B1 | 11/2002 | Fritze et al. | |
| 6,519,963 B2 * | 2/2003 | Maeda | 62/259.2 |
| 6,552,663 B2 | 4/2003 | Swartzel et al. | |
| 6,693,539 B2 | 2/2004 | Bowers et al. | |
| 6,741,236 B2 | 5/2004 | Yun | |
| 6,758,397 B2 | 7/2004 | Catan | |
| 6,859,745 B2 | 2/2005 | Carr et al. | |
| 6,892,545 B2 | 5/2005 | Ishikawa et al. | |
| 6,982,640 B2 | 1/2006 | Lindsay et al. | |
| 7,009,519 B2 | 3/2006 | Leonard et al. | |
| 7,017,359 B2 | 3/2006 | Kim et al. | |
| 7,027,958 B2 | 4/2006 | Singh et al. | |
| 7,044,370 B2 | 5/2006 | Bellis, Jr. et al. | |
| 7,053,773 B2 | 5/2006 | McGarry et al. | |
| 7,340,414 B2 | 3/2008 | Roh et al. | |
| 7,378,968 B2 | 5/2008 | Wang et al. | |
| 7,495,561 B2 * | 2/2009 | Bodin et al. | 340/572.1 |
| 2002/0003531 A1 | 1/2002 | Kim et al. | |
| 2002/0026325 A1 | 2/2002 | Hirahara et al. | |
| 2002/0066279 A1 | 6/2002 | Kiyomatsu | |
| 2002/0139848 A1 | 10/2002 | Catan | |
| 2002/0157411 A1 | 10/2002 | Ishikawa et al. | |
| 2002/0178066 A1 | 11/2002 | Roh et al. | |
| 2003/0015585 A1 | 1/2003 | Wike, Jr. et al. | |
| 2003/0061129 A1 | 3/2003 | Todd et al. | |
| 2004/0009465 A1 | 1/2004 | Luckanatinvong | |
| 2004/0031274 A1 | 2/2004 | Cho et al. | |
| 2004/0035123 A1 | 2/2004 | Kim et al. | |
| 2004/0100380 A1 | 5/2004 | Lindsay et al. | |
| 2004/0253733 A1 | 12/2004 | Prusik et al. | |
| 2004/0254759 A1 | 12/2004 | Kubach et al. | |
| 2005/0008539 A1 | 1/2005 | Matsuura et al. | |
| 2005/0082376 A1 * | 4/2005 | Lubow et al. | 235/494 |
| 2005/0086108 A1 | 4/2005 | Sakamoto et al. | |
| 2005/0132725 A1 * | 6/2005 | Menten et al. | 62/126 |
| 2005/0155372 A1 * | 7/2005 | Dentella et al. | 62/441 |
| 2005/0258961 A1 | 11/2005 | Kimball et al. | |
| 2006/0006999 A1 | 1/2006 | Walczyk et al. | |
| 2006/0055530 A1 | 3/2006 | Wang et al. | |
| 2006/0171570 A1 * | 8/2006 | Brendley et al. | 340/5.52 |
| 2006/0210115 A1 | 9/2006 | Nemet | |
| 2007/0035380 A1 | 2/2007 | Overhultz et al. | |
| 2008/0052001 A1 | 2/2008 | Bodin et al. | |
| 2008/0052037 A1 | 2/2008 | Bodin et al. | |
| 2008/0052200 A1 | 2/2008 | Bodin et al. | |
| 2008/0052201 A1 | 2/2008 | Bodin et al. | |
| 2008/0052202 A1 | 2/2008 | Bodin et al. | |
| 2008/0055084 A1 | 3/2008 | Bodin et al. | |

FOREIGN PATENT DOCUMENTS

WO     WO 2005015510 A1 *     2/2005

OTHER PUBLICATIONS

Lindsay et al., "Retial RFID Systems Without Smart Shelves", 2003, pp. 1-13, retrieved May 30, 2006 http://www.jefflindsay.com/rfid1.shtml.

Gilbert, "Major retailers to test smart shelves" ZDNet News: Jan. 8, 2003, pp. 1-6, retrieved May 31, 2006 http://news.zdnet.com/2100-9584_22-979710.html.

"itag", itag RFID—Smart Shelf, AC/Corporation, pp. 1-2, 2003-2006, retrieved May 12, 2006, http://www.ac-corporation.com.ph/products/iTAG/solutions/shelves.asp.

"Automated Livestock management with RFID-Driven Production Systems—15 Years of Work Applying RFID Technology to the Real World", Osborne Industries Inc., 2005, pp. 1-26.

USPTO Office action for related U.S. Appl. No. 11/467,214 dated Sep. 2, 2009.

* cited by examiner

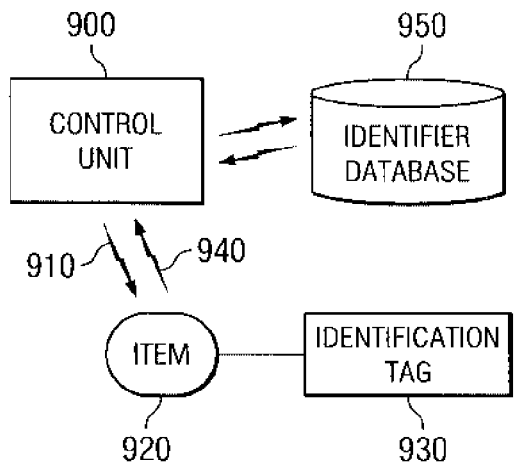
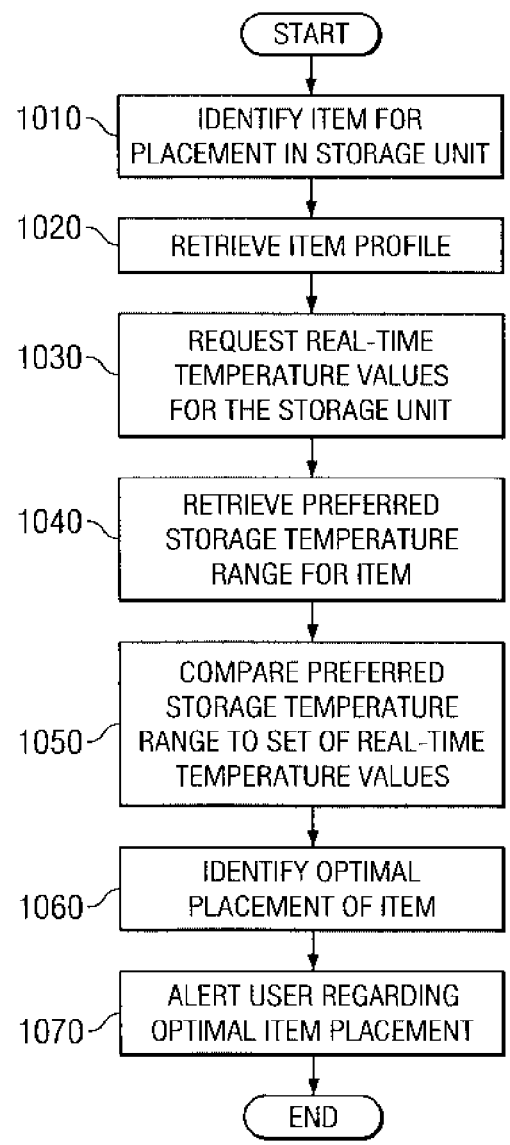

METHOD AND APPARATUS FOR TEMPERATURE BASED PLACEMENT OF AN ITEM WITHIN A STORAGE UNIT

BACKGROUND

1. Field of the Invention

The present application relates generally to an improved data processing system, and in particular to a method and apparatus for storing items. Still more particularly, the present invention is directed to a computer implemented method, an apparatus, and a computer usable program product for optimal placement of items in a storage unit based on temperature readings within the storage unit.

2. Description of the Related Art

Typically, households and businesses store a variety of perishable items that require storage within a given temperature range to prevent and/or slow decay of the perishable items. Perishable items are frequently stored in a refrigeration unit, such as a refrigerator or freezer to preserve perishable items. Cold temperatures permit food and other perishable items to stay fresh longer by slowing the growth of bacteria.

For example, bacteria will spoil milk in a few hours if the milk is left at room temperature. However, by storing milk and other dairy products in a refrigerator at a temperature range of 40-45° F. the milk will stay fresh for a week or two. By freezing the milk in a freezer, the milk will remain unspoiled for significantly longer, such as two or three months. Thus, food stuffs such as dairy products and meat require storage at a temperature colder than room temperature to prevent/slow spoilage.

An optimum storage temperature for perishable items varies depending the type of item and the desired storage period. For example, apples may have a preferred storage temperature in a range of 38-42° F. while tomatoes are preferably stored at a temperature range of 55-70° F. for temporary storage. However, for storage that will last longer than a few days or a week, a lower temperature would be preferred.

Therefore, it is important for a user to determine an optimal temperature for storing perishable items in order to prevent/slow spoilage and decay of those perishable items. Current refrigeration units permit a user to set a refrigerator and freezer compartment on a refrigeration unit to a desired temperature. However, temperature within a refrigeration unit can vary at different locations within the refrigeration unit, especially in large industrial size refrigerators and industrial sized freezers. For example, an area around a door of a refrigerator is typically not as cold as an area at the back of the refrigerator.

Moreover, as more items are added to a particular area of the refrigeration unit, the additional mass will affect temperature in that region. The region may no longer be an optimal location for a given item that is stored in that area.

In addition, temperature variations are affected by the size of the refrigeration unit. As a refrigeration unit size increases, such as in an industrial refrigerator or industrial freezer, the temperature variations within the refrigeration unit increase dramatically. Thus, temperature variations would be greater in an industrial sized refrigerator as compared to a consumer sized refrigerator.

Current refrigeration units do not permit a user to accurately determine temperature variations at different areas within a refrigeration compartment. Therefore, users must estimate or guess which location in a refrigeration unit would provide the best temperature for food storage. If a user placed an item in a location in a refrigeration unit where the temperature is too warm for the item, the item will spoil too rapidly. This untimely spoilage results in unnecessary expense in replacing those spoiled items, as well as creating a health hazard due to the risk of food poisoning if a spoiled item is inadvertently consumed.

SUMMARY

The aspects of the illustrative embodiments provide a computer implemented method, apparatus, and computer usable program product for identifying an optimal placement of an item within a storage unit. The process identifies an item for placement in the storage unit. The process determines an optimal storage temperature for the identified item. The process then identifies an optimal placement location within the storage unit for the identified item based on the optimal storage temperature and a set of temperature readings for the storage unit.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

FIG. 9 is a block diagram illustrating an interaction of a user interface and tag reader with an identification tag in accordance with an illustrative embodiment; and FIG. 10 is a flowchart illustrating a process for detecting a usage of a given item within a storage unit utilizing triangulation in accordance with an illustrative embodiment.

DETAILED DESCRIPTION OF THE PREFERRED EMBODIMENT

Figure 1:
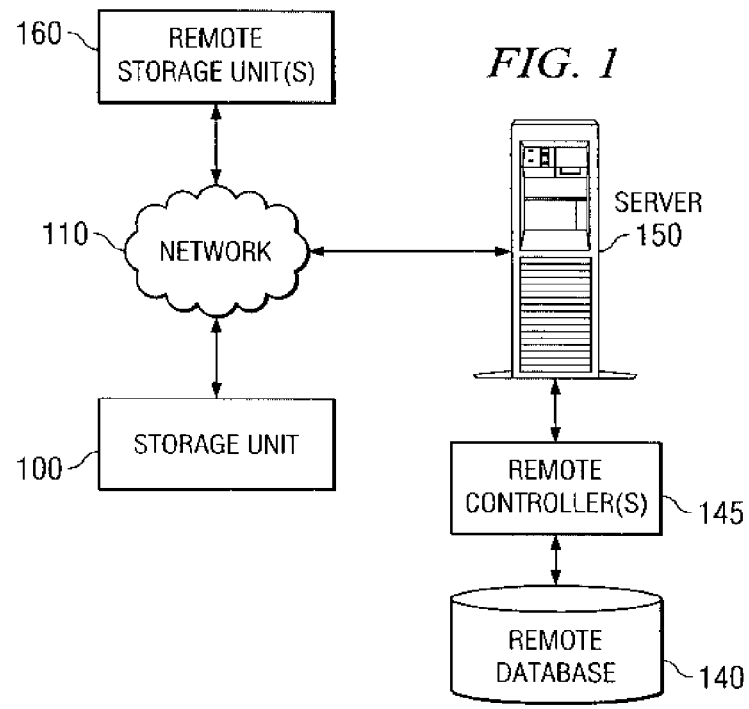
FIG. 1 is a pictorial representation of a network of storage units in accordance with an illustrative embodiment.

Perishable items are items that require storage within a given temperature range to prevent and/or slow decay of the perishable items. Perishable items are frequently stored in a refrigeration unit, such as a refrigerator or freezer to preserve the perishable items. Cold temperatures permit food and other perishable items to stay fresh longer by slowing the growth of bacteria. Thus, food stuffs such as dairy products and meat require storage at a temperature colder than room temperature to prevent/slow spoilage.

An optimum storage temperature for perishable items varies depending on the type of item and the desired storage period. Therefore, it is important for a user to determine an optimal temperature for storing perishable items in order to prevent/slow spoilage and decay of those perishable items and keep items fresh for longer periods of time.

Current refrigeration units permit a user to set a refrigerator and freezer compartment on a refrigeration unit to a desired temperature. However, temperature within a refrigeration unit can vary at different locations within the refrigeration unit, especially in large industrial sized refrigerator and freezer units. For example, an area around a door of a refrigerator is typically not as cold as an area at the back of the refrigerator. Moreover, as more items are added to a particular area of the refrigeration unit, the additional mass will affect temperature in that region. The region may no longer be an optimal location for a given item that is stored in that area. In addition, temperature variations are affected by the size of the refrigeration unit. As a refrigeration unit size increases, such as in an industrial refrigerator or industrial freezer, the temperature variations within the refrigeration unit increase dramatically.

Current refrigeration units do not permit a user to accurately determine temperature variations at different areas within a refrigeration compartment. Therefore, users must estimate or guess which location in a refrigeration unit would provide the best temperature for food storage. If a user placed an item in a location in a refrigeration unit where the temperature is too warm for the item, the item will spoil too rapidly. This untimely spoilage results in unnecessary expense in replacing those spoiled items, as well as creating a health hazard due to the risk of food poisoning if a spoiled item is inadvertently consumed. Therefore, the illustrative embodiment recognizes a need for a process to determine an optimal placement for a given item within a storage unit based on the identification of the item and a preferred storage temperature range for the identified item.

As used herein, a storage unit is an appliance, room, or repository for storing and/or displaying items. A storage unit typically includes shelves or compartments to hold and/or organize items. A storage unit includes, but is not limited to, a refrigeration unit, a pantry, a storeroom, a cabinet, a set of shelves, a cupboard, a boxcar, a trailer, and/or any other compartment or container having space for storing and/or displaying items.

As used herein, a consumable item is any item that is depleted through use. Consumable items include, but are not limited to, food items, beverage items, soap, detergents, medicine, disposable paper products, and/or any other item that is depleted through use. Consumable items are generally consumed or depleted on a regular or semi-regular basis and then replaced and/or replenished by users in order to maintain a supply of these items in an inventory.

Items to be placed in a storage unit can be identified using a Universal Product Code. A Universal Product Code (UPC) is a machine readable bar code coupled with a human-readable Universal Product Code number. The Universal Product Code includes a six-digit manufacturer identification number that provides information regarding a product, such as the manufacturer identification and product item number. A unique universal product code is not assigned to more than one product.

A Universal Product Code scanner can read a Universal Product Code associated with a particular product to identify the product. However, to maintain current inventories, each item in an inventory must be manually scanned with a bar code reader. In addition, the Universal Product Code cannot provide information regarding the temperature variations within a storage unit or the optimal placement of an item in the storage unit based on the temperature variations.

Radio frequency identification (RFID) can be used to identify, locate, and track items in an inventory. Radio frequency identification (RFID) is an automated identification method that is typically utilized in automating integrated supply chains within retail and distribution to identify and/or locate items currently in stock. Radio frequency identification systems utilize Radio frequency identification readers and Radio frequency identification tags to identify objects associated with a Radio frequency identification tag.

A Radio frequency identification reader is a device that includes a transmitter and a receiver. The reader transmits an interrogate signal to Radio frequency identification tags within an interrogate zone of the reader. The reader receives radio frequency transmissions from the tags in response to the interrogate signal. The reader can estimate an approximate location of the tags based on the strength and direction of the response signal received from a given radio frequency identification tag.

Radio frequency identification tags, also referred to as transponders, identification tags, or smart tags, are small integrated circuits coupled with an antenna to transmit data. Multiple Radio frequency identification tags can reside within an interrogate zone of a Radio frequency identification reader. In response to receiving an interrogate signal, Radio frequency identification on tags transmit a radio frequency response signal to the reader via an antenna associated with the tag. The response signal typically includes identification data, such as an identification code.

The reader receives the radio frequency response transmissions from the identification tags. The reader can identify a product based on the identification code included in the response signal. The reader can also estimate an approximate location of the tag based on the strength and direction of the response signal.

Each Radio frequency identification tag in the interrogate zone can be individually recognized by the Radio frequency identification tag reader based on the identification codes transmitted by each tag. Thus, a Radio frequency identification tag reader can take an entire inventory of all items within an interrogate zone having a Radio frequency identification tag without requiring intervention of a human user. However, Radio frequency identification cannot be utilized to determine a real-time temperature variations within a given storage unit or determine an optimal placement of an item based on the temperature variations.

The illustrative embodiments recognize the need for a system to track the real-time temperature variations occurring within a storage unit and determine an optimal placement of a given item with the storage unit based on those temperature variations. Therefore, the illustrative embodiments provide a computer implemented method, apparatus, and computer usable program code for optimal placement of items in a storage unit based on temperature readings within the storage unit.

As used herein, real-time temperature variations refer to the ongoing or current changes in temperature readings as the temperature changes occur. The process monitors current or real-time temperature changes on a continuous/ongoing basis to identify temperature changes as the temperature changes occur.

The process identifies an item for placement in the storage unit. The process determines a preferred storage temperature for the identified item. The process then selects an optimal placement location within the storage unit for the identified item based on the preferred storage temperature and a set of temperature readings for the storage unit.

As used herein, an item includes, but is not limited to, an individual consumable product in a single container, multiple consumable products in a single container, a carton or case of multiple containers, a pallet of multiple cartons or cases; and/or a load, such as a truckload, shipload, or railcar load, having multiple pallets. As used herein, a container is any disposable or reusable package, receptacle, carton, can, jar, or any other object to hold, carry, or enclose one or more items for transport and/or storage.

FIG. 1 is a pictorial representation of a network of storage units in accordance with an illustrative embodiment. Storage unit 100 is a storage unit connected to network 110. Network 110 is a medium used to provide communications links between various devices and storage units connected together, such as storage unit 100 and remote storage unit(s) 120. Network 110 may include connections, such as wire, wireless communication links, or fiber optic cables.

Storage unit 100 connects to network 110 along with one or more remote storage unit(s) 160. In addition, remote databases(s) 140 and remote control unit(s) connect to network 110 via one or more servers, such as server 150. In the depicted example, server 150 provides data, such as boot files, operating system images, and applications to remote controller(s) 145 and remote storage unites) 160. Network 110 may include additional servers, clients, and other devices not shown.

Figure 2:
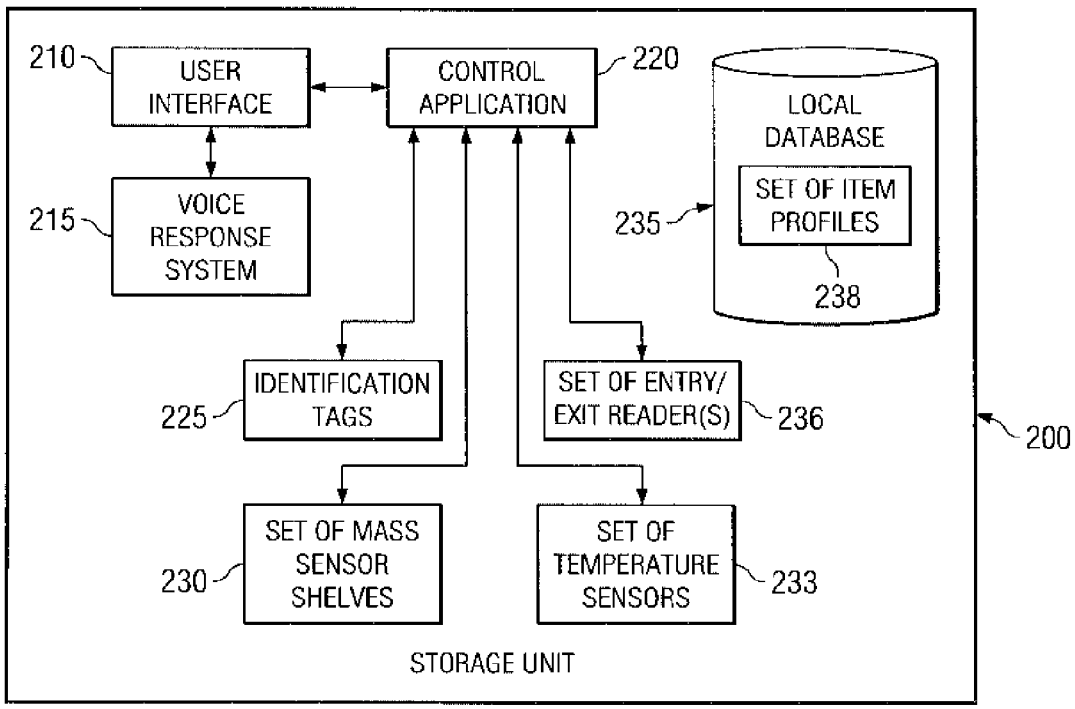
FIG. 2 is a pictorial representation of a storage unit in accordance with an illustrative embodiment.

FIG. 2 is a pictorial representation of a storage unit in accordance with an illustrative embodiment. Storage unit 200 is a storage unit, such as storage unit 100 and remote storage unit(s) 160 in FIG. 1.

User interface 210 provides a digital display for providing output to a user, as well as a keypad and/or touch screen for receiving input from a user. User interface 210 is associated with voice response system 215. Voice response system 215 includes a microphone, speaker, and voice synthesizer. Voice response system 215 permits users to provide verbal input to control application 220. Voice response system 215 also permits users to receive verbal output from control application 220.

Control application 220 is an application for receiving input and sending output to a user via user interface 210. Control application 220 also identifies items associated with an identification tag from set of identification tags 225. Each identification tag in set of identification tags 225 is associated with a given item in storage unit 200 or a given item to be placed in storage unit 200. Each identification tag has a unique item identification code associated with the identification tag. In this illustrative example, set of identification tags 225 is a set of Radio frequency identification tags associated with a set of consumable items inside storage unit 200.

Set of mass sensor shelves 230 is a set of one or more customized shelves having a mass sensor grid on an upper surface of the shelf. Each mass sensor associated with a mass sensor shelf is an independent sensor capable of measuring a mass of an object resting on the mass sensor. Each mass sensor transmits mass sensor measurements in the form of mass sensor data to control application 220.

Control application 220 receives real-time temperature readings from set of temperature sensors 233. Each temperature sensor is set of temperature sensors 233 is located in a different area of storage unit 200. The temperature readings sent by set of temperature sensors 233 includes real-time temperature readings for every area of storage unit 200.

Control application 220 stores mass footprint data, mass sensor data, item identification data, and meta information for each item stored in storage unit 200 in a local database 235 and/or remote databases, such as remote databases) 140 in FIG. 1. Local database 235 is any type of known or available data storage device. In this illustrative example, local database 235 is depicted as a database located on storage unit 200. However, local database 235 can also include any secondary data storage device and/or a remote data storage device, such as remote database 140 in FIG. 1. Local database 235 can be a single data storage device or multiple data storage devices.

Mass sensor data for an identified item includes a current mass for an item, a prior mass for the item, an initial mass for the item, a depleted mass for the item, and a non-depleted mass for the item. A current mass is the most recent mass measurement for the item. The prior mass for the item is the previous mass for an item. The initial mass is the first mass measurement for the item when the item is identified by control application 220 for the first time. The depleted mass is the tare or mass of the item's empty container. In other words, the depleted mass is the mass of the item after the contents or product has been completely consumed and the empty item container is all that remains.

The net weight of the item is the depleted mass of the item subtracted from the gross weight of the item. The non-depleted mass is the net weight of the item. The non-depleted mass is a predetermined/predefined quantity of an item prior to use by a consumer. In other words, a non-depleted mass of a consumable item is the mass of the item at the time the item is purchased in an original unused condition. In an alternative embodiment, the non-depleted mass can be calculated by subtracting the item's tare weight from the item's initial or gross weight.

Meta information includes details like timestamps associated with an item expiration data, a data and/or time when an item is first detected entering a storage unit, a time when an item is removed from a storage unit, a time interval between a time when an item is removed from a storage unit and the time when the item is returned to the storage unit, and any other time and/or data information relevant to an item freshness, perishability, and expiration information. Meta information is associated with each identified item stored in storage unit 200. Thus, control application 220 can provide a warning or alert when an item is past its expiration date and/or no longer fit for human consumption due to the age of the item. Control application 220 monitors mass sensor data and meta information for each item based on the mass sensor data, meta information, and item identification information stored in local database 235 and/or remote databases.

Item identification data includes an identification code from each identification tag in set of identification tags 225. Each identification code is associated with an item description. The item description describes the item. For example, an item description for cereal could be "Apple Jacks®," or "Frosted Flakes®."

Set of item profiles 238 is a set of one or more item profiles. An item profile includes an item identification field, an optimal temperature range field and/or a threshold temperature field. An item identification field includes identification data regarding the name of the item and the initial or non-depleted quantity of the item. The optimal temperature range field includes an upper temperature value and a lower temperature value defining a range of optimal temperatures for storage of the item. The threshold temperature field includes an upper temperature value and a lower temperature value at which the item will not remain fresh and/or preserved. In accordance with this illustrative example, set of item profiles 238 includes a set of optimal temperature ranges for each item in storage unit.

Set of item profiles 238 is stored in local database 235. Set of item profiles 238 may also be stored in a remote database, such as remote database 140 in FIG. 1.

In an alternative example, a user enters an optimal temperature for a given item via user interface 210. In another exemplary embodiment, control application 220 retrieves an optimal temperature range for an item from an identification tag response signal transmitted to an item identifier by the identification tag.

Set of item identifier(s) 236 is a set of one or more item identifier(s). Item identifiers are used to identify an item as well as to determine an approximate location of an item and a precise location of an item. An approximate location of an item can be determined by a single item identifier. The item identifier receives a response signal from an identification tag. Control application 220 can determine an approximate location of the identification tag based on the strength and direction of the response signal. The item identifier generates approximate location coordinates for the approximate location of the identification tag. An item identifier in set of item identifier(s) 236 can be implemented by a radio frequency identification tag reader, a Universal Product Code scanner, or any other device for obtaining information from an identification tag. In an example in which the item identifier is a Universal Product Code scanner, a user scans each item at the Universal Product Code scanner. In an alternative example, a user can manually enter an identification code, item identifier, or other item description at a user interface rather than utilizing an item identifier.

Control application 220 can determine a precise location by triangulating a set of approximate coordinates generated by two or more location sensors, such as set of item identifiers 236. The triangulated coordinates form a set of coordinates for the precise location of the identified item in storage unit 200.

Set of item identifier(s) are activated by control application 220 each time a door on storage unit 200 is opened. Each time set of item identifier(s) 236 are activated, set of item identifiers 236 generates an interrogate signal. In response to receiving the interrogate signal, set of identification tags 225 generates a response signal. Set of item identifier(s) 236 identifies and locates the items associated with set of identification tags 225 based on the response signals.

Thus, in this illustrative example, control application activates set of item identifiers 236 when control application detects a door of storage unit 200 is opened. An item identifier transmits an interrogate signal. The item identifier identifies an item based on a response signal received from an identification tag associated with the item as the item enters storage unit 200 to form an identified item.

Control application 220 retrieves an optimal temperature range for the identified item from local database 235. As used herein, an optimal temperature range includes one or more temperature values, as well as an upper temperature value and a lower temperature value defining a range of optimal temperatures.

Control application 220 requests the real-time temperature readings from set of temperature sensors 233. Based on the preferred storage temperature range for the item and the temperature readings for the set of areas in storage unit, control application determines an optimal placement for the given item. Control application 220 notifies the user as to the optimal placement of the given item in the storage unit via user interface 210.

In an alternative embodiment, control application 220 requests real-time temperature readings from set of temperature sensors 233 when a user enters a query regarding an optimal location for a given item at user interface 210.

After a user places the identified item on a mass sensor shelf in storage unit 200, control application 220 determines a location where the identified item was placed by requesting mass sensor data from set of mass sensor shelves 230.

Control application 220 determines the location of the item based on a mass footprint of the item generated when the item is placed on a given mass sensor shelf. The item's mass footprint is an impression of a portion of the item in contact with a mass sensor shelf. If two or more items are placed in the storage unit with a time interval occurring between placement of the items inside the storage unit, control application 220 associates a first change in mass data with the first item identified entering the storage unit. Control application 220 associates a second change in mass data with an item identified entering the storage unit second in time. Control application 220 utilizes the change in mass data to create a mass footprint and determine a current mass for the item identified immediately prior in time to the change in mass data.

If two or more items are identified entering the storage unit at the same time with no time interval in between the two items, control application 220 will associate a change in mass sensor data with the identified item having a corresponding mass footprint. For example, if a user places a jar of peanut butter and a carton of orange juice 200 at the same time, control application 200 will associated mass footprint data indicating a round mass footprint with the jar of peanut butter and associated mass footprint data indicating a square mass footprint with the carton of orange juice. Thus, control application 220 can distinguish items placed inside storage unit 200 simultaneously based on mass footprint data, such as the shape of the mass footprint.

If a user places two or more items in storage unit 200 at the same time that have similar mass footprint data, such as a jar of peanut butter and a jar of jelly, control application 220 will generate an error message and/or prompt a user to indicate a location and/or an identification of each item placed in the storage unit simultaneously.

Control application 220 generates current mass footprint data providing a mass footprint and current mass for each item on each mass sensor shelf in storage unit 200. Control application 220 generates mass footprint data based on mass data received from mass sensor shelves. Control application 220 compares the current mass footprint data to previous mass footprint data for each mass sensor shelf in set of mass sensor shelves 230. Previous mass footprint data is stored in local database 235. Previous mass footprint data is data regarding mass footprint and mass of each item on a mass sensor shelf in set of mass sensor shelves 230 the last time a user opened a door of storage unit 200.

Control application determines a location for a set of mass sensors registering a change in mass sensor data. The location of the change in mass sensor data is estimated to be the approximate location on of the given item placed inside storage unit.

Control application 220 also obtains an approximate location for the given item placed in storage unit by activating set of item identifiers(s) 236 to transmit an interrogate signal. Control application 220 determines an approximate location of the identification tag associated with the given item based on the strength and direction of the response signal transmitted by the identification tag associated with the given item. A single item identifier generates estimated coordinates for the approximate location of the identified item based on the response signal. This approximate location on is associated with the identified item.

In an alternative embodiment, control application 220 determines a precise location for the single entering item based on a triangulated coordinates for the item. The control application generates triangulated coordinates by triangulating a set of two or more estimated coordinates generated by two or more item identifiers to form a precise location for the identified item. The triangulated coordinates for the precise location of the identified item are associated with the identified item.

In the alternative, control application 220 verifies that only a single identification tag was detected entering a given mass sensor shelf. If control application 220 determines that more than one identified item was detected entering the same mass sensor shelf and/or mass sensor data is received from more than one set of mass sensors on the same mass sensor shelf, control application 220 will make an educated guess as to which set of mass sensor data is associated with each identified item based on an identification of the item, a non-depleted mass for each item, an initial mass for each item, a prior mass for each item, and/or current mass measurements received from each set of mass sensors. Control application 220 prompts user to confirm the identification and estimated location of each item via user interface 210.

Control application 220 can estimate which set of mass sensor data is associated with each identified item when two or more items are removed from storage unit 200 or entered into storage unit 200 by comparing previous mass footprints to current mass footprints to determine which mass footprint belongs to which identified item. Other factors, such as previous mass, current mass, non-depleted mass, mass footprint shape, previous items removed from storage unit 200, and items due to be replaced, can be looked up in a database to determine which mass footprint data belongs to which item.

Control application 220 monitors temperature variations at the location of the given item. Control application 220 monitors real-time temperature variations at locations for each identified item in storage unit 200 by comparing current temperature readings with an optimal temperature range for the given item. If the temperature reaches an upper temperature threshold or falls below a lower temperature threshold for the given item, control application 220 notifies the user via user interface 210. The notification can include a current location of the item, a warning that the item is not currently stored in an optimum temperature location and/or include a new optimum location for the given item.

In another illustrative embodiment, a user may fail to scan an item at a location sensor and/or one or more location sensors may be absent, malfunctioning or otherwise unavailable or unable to detect/identify items entering storage unit and exiting storage unit 200. In such a case, control application 220 can determine when an item is placed inside storage unit 200 and/or removed from storage unit 200 based on mass footprint data for items. Control application 220 uses the detection of item footprints for previously identified items to detect an item entry into storage unit 200 and/or the item exit/removal from storage unit 200. For example, if a user removes a jar of peanut butter and a carton of milk, control application 220 detects the removal of these two items based on the removal of the detected mass footprint on a mass sensor shelf associated with these items. In other words, when the two items are removed, the mass sensor data registered by the mass sensor shelf changes. Control application 220 can determine that the jar of peanut butter and the carton of milk were removed based on the absence of the footprint for the carton of milk and the footprint for the jar of peanut butter.

In this example, the user consumes some product from the carton of milk and jar of peanut butter then places the peanut butter and milk back into storage unit 200 within a configurable time interval. Control application 220 knows that two previously identified items were removed and two items with the same footprint have been added to storage unit 200. Control application 220 can check to ensure that the mass of the two items has not increased above the previous mass for the two remove items. Control application then correlates the items placed on the mass sensor shelf by matching the footprint of the two added items to the previously removed items. If mass for one of the items has increased, the increase in mass could indicate replenishing or adding to the contents of the item container. In addition, an increase in mass for an item could indicate a different item with the same footprint. In this case, re-identification or re-scanning of the item is necessary. In one example in which re-identification is required, control application 220 will prompt user to enter an item identification for the item with the increased mass via a user interface or a voice response system. In this manner, control application 220 can identify/detect items that are not scanned and/or are not easily scanned on location sensors. An item could be difficult to scan if the item lacked radio frequency identification tags, the item identifier is a universal product code that must be manually scanned by a user, a user fails to scan an item, location sensors are malfunctioning, identification tags are malfunctioning, or location sensors and identification tags otherwise fail to provide an identification for the item. Thus, the illustrative embodiments permit triggering event handling of items based on a change in mass footprint data. A change in mass footprint data includes the appearance and disappearance of an item. Event handling of items includes depletion monitoring of items.

In this illustrative example, control application 220 is depicted as a separate component from item identifiers. However, in accordance with the illustrative embodiments, control application 220 can be combined with one or more item identifiers as a single component.

Figure 3:
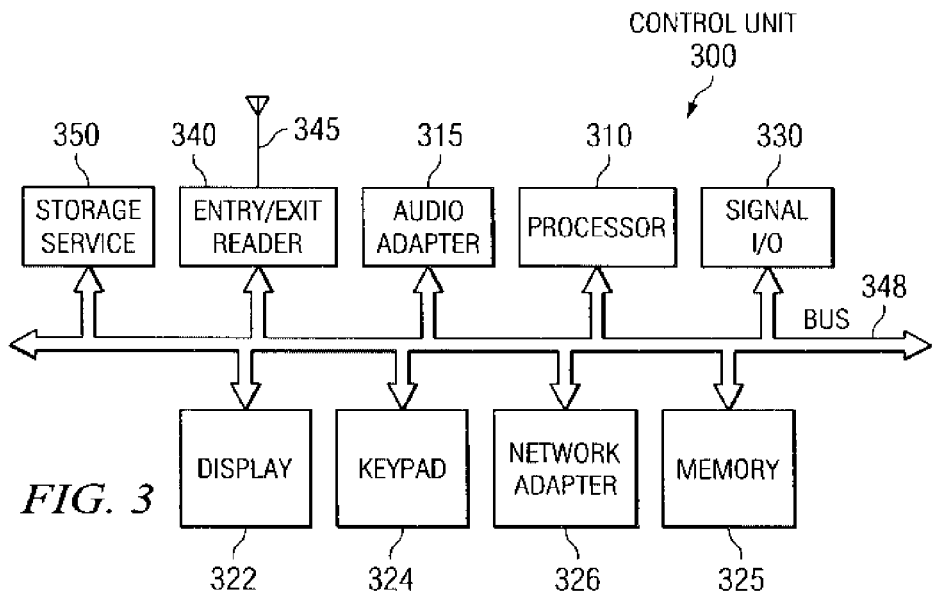
FIG. 3 is a block diagram of a control unit in accordance with an illustrative embodiment.

FIG. 3 is a block diagram of a control unit in accordance with an illustrative embodiment. A control unit is an application that analyzes the mass data from the set of mass sensors to determine the current mass of the object. Control unit 300 is an example of hardware for implementing a control application, such as the control application 220 in FIG. 2. Control unit 300 is a hardware in which code or instructions implementing the processes of the illustrative embodiments may be located. Control unit 300 executes computer usable program code for controlling item identifiers, mass sensor shelves, and a user interface in accordance with the illustrative embodiments.

Processor 310, audio adapter 315, memory 325, display 322, keypad 324, network adapter 326, and signal input/output (I/O) 330 are connected via bus 348. Bus 348 may be comprised of one or more buses, such as a system bus and/or an I/O bus. Bus 348 may be implemented using any type of communications fabric or architecture that provides for a transfer of data between different components or devices attached to the fabric or architecture.

Processor 310 may include one or more processors or CPUs. Memory 325 may be a main memory, a read only memory (ROM), a random access memory (RAM), flash memory, a cache, or any other known or available memory for storing data, instructions, and/or computer usable program code. Controller 300 retrieves data, instructions, and/or code from memory, such as main memory or read only memory. In addition, controller 300 can retrieve data, instructions, and/or code from a remote memory location via a network connection.

Display 322 can include a touch screen display, an LED display, or any other type of known or available display for presenting output to a user or receiving input from a user. Keypad 324 is any type of known or available alphanumeric keypad for a user to provide input in the form of data, instructions, or program code to controller 300.

Network adapter 326 is coupled to the system to enable the data processing system to become coupled to other data processing systems or remote printers or storage devices through intervening private or public networks. Modems, cable modem and Ethernet cards are just a few of the currently available types of network adapters.

Signal input/output 330 includes one or more devices for sending and receiving signals to and from different components in a storage unit, such as a digital display and keypad, a touch screen, a voice recognition interface, an LED display, and/or any other known or available devices for sending and receiving input and output.

Tag reader 340 is an item identifier such as set of item identifiers 236 in FIG. 2. Item identifier 340 transmits an interrogate signal to determine an identification and/or location of identification tags within an interrogate zone of item identifier 340.

Controller 300 is coupled to item identifier 340 via bus 348. Controller 300 activates item identifier 340 to transmit an interrogate signal to identify any Radio frequency identification tags within an interrogate zone of item identifier 340. As used herein, an interrogate zone is a zone or region in which an interrogate signal has sufficient strength to be received by a Radio frequency identification tag within the interrogate zone and trigger the Radio frequency identification tag to transmit a radio frequency in response to the interrogate signal.

Storage device 350 is also optionally connected to bus 348. Storage device 350 may include any type of permanent and removable storage media. In addition, storage device 350 can include a remote storage device or storage provided by a storage service. Program code and instructions are located on storage device 350 and may be loaded into memory 325 for execution by processor 310.

The processes of the illustrative embodiments are preformed by processor 310 using computer implemented instructions, which may be located in memory 325. Processor 310, memory 325, signal input/output 330, and storage device 350 are functional components that can be implemented as functions in an application specific integrated circuit rather than using a processor paradigm.

Figure 4:
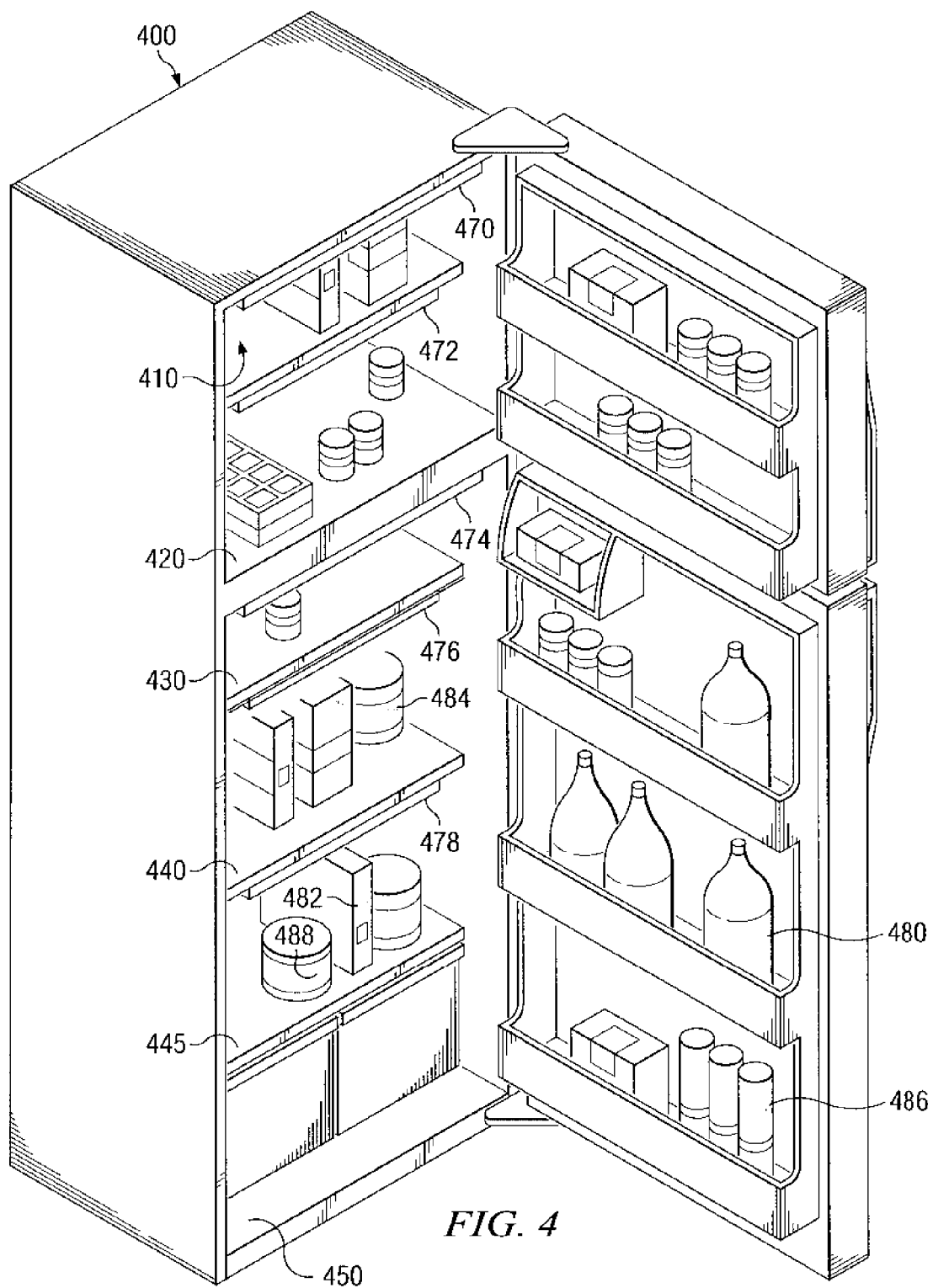
FIG. 4 is a block diagram of a refrigeration unit including a set of mass sensor shelves and item identifiers in accordance with an illustrative embodiment.

FIG. 4 is a block diagram of a refrigeration unit including a set of mass sensor shelves and item identifiers in accordance with an illustrative embodiment. As used herein, a refrigeration unit is any device, appliance, cabinet or room for storing food or any other substance at a lower temperature than room temperature. For example, a refrigeration unit includes a refrigerator, a freezer, a combination refrigerator and freezer, an ice box, a refrigerated railcar, a meat locker, an industrial refrigerator, an industrial freezer, a chest freezer, a reach-in cabinet, meat cases, frozen food cabinets, beverage coolers, food service carts, ice cream cabinets, soda fountain units, and any other known or available device or appliance for storing solid, semi-solid, or liquid items at a temperature lower than room temperature.

Refrigerator 400 is an example of a storage unit, such as storage unit 100 and remote storage unit(s) 160 in FIG. 1 and storage unit 200 in FIG. 2. Refrigerator 400 is any known or available type of refrigerator. In this illustrative example, refrigerator 400 is depicted as a consumer size refrigerator/freezer combination appliance. However, the illustrative embodiments are equally applicable to a refrigeration unit of any size, including, but not limited to, an apartment sized refrigerator/freezer, a room sized industrial refrigerator, and/or a room-sized industrial freezer.

Refrigerator 400 includes a set of mass sensor shelves. As used here, a set of mass sensor shelves includes a single mass sensor shelf, as well as two or more mass sensor shelves. The set of mass sensor shelves includes mass sensor shelves 420-450. Each mass sensor shelf has a grid of mass sensors. Each mass sensor in the grid is capable of detecting a whole or partial mass of an object. The mass of an object is detected when an object is completely or partially resting on any portion of a mass sensor.

In accordance with the illustrative embodiments, a mass sensor shelf can be a shelf in a main compartment of a refrigeration unit, a shelf in a door, a bottom surface of a compartment of a refrigerator or freezer, a bottom of a door compartment, a bottom surface of a drawer, a bottom surface of a specialized egg compartment, or any other surface within a storage unit that can hold or store an item. For example, in this illustrative embodiment, mass sensor shelf 420 is a mass sensor shelf located in a freezer compartment of refrigerator 400. Mass sensor shelf 425 is a shelf in a door of the refrigerator. Mass sensor shelves 430-445 are mass sensor shelves located in a refrigerator compartment of refrigerator 400. Mass sensor shelf 450 is a mass sensor shelf located in the bottom of a drawer of refrigerator 400.

Refrigerator 400 includes a set of item identifiers, such as item identifiers 470-478. Item identifiers 470-478 are Radio frequency identification readers. Item identifiers 470-478 identify an item entering or exiting refrigerator 400 based on information provided by an identification tag associated with the item. Item identifiers 470-478 are also location sensors that determine a precise location of an item by triangulating coordinates obtained by two or more item identifiers.

Location sensors are sensors for obtaining a precise location of an item having an identification tag by comparing location data from two or more location sensor devices, such as item identifiers 470-478. Location sensors include, but are not limited to, radio frequency identification readers for obtaining location data from one or more Radio frequency identification tags, ultrasonic receivers for obtaining location data from one or more ultrasonic transmitters, and/or any other location systems for obtaining a location of an item in a storage unit.

In this illustrative example, item identifiers 470-478 are location sensors used to obtain an exact location of a item in a storage unit, such as refrigerator 400. A single item identifier can determine an approximate coordinate location based on a strength and direction of a response signal sent by an identification tag. The approximate coordinates for the given identified item obtained from two or more item identifiers are triangulated to obtain triangulated coordinates. The triangulated coordinates provide an exact location or position for the identified item. The mass of the identified item can be obtained from a set of one or more mass sensors located at the precise location of the identified item in the storage unit.

Refrigerator 400 also includes a control application for controlling item identifiers 470-478 and receiving mass data from the set of mass sensor shelves associated with refrigerator 400. The control application is coupled to a user interface.

The user interface receives data from a user and provides data to a user. In this example, the user interface is located on an outside panel of a door or outer side wall of refrigerator 400, although the user interface is not depicted in the figure.

The user interface is a digital display and keypad that provides output to a user and accepts input from the user. The digital display is any type of display for providing information to a user in the form of characters, numbers, symbols, or letters. The display also includes a touch screen for accepting input from a user. The keypad is an input device for data entry by a user. The keypad comprises alphanumeric keys and functional keys. In another example, the user interface includes voice recognition software coupled to a microphone and a voice synthesizer for accepting verbal input from a user and providing verbal output to a user.

Refrigerator 400 includes a variety of items stored within refrigerator 400. A number of the items have an identification tag associated with the item, such as identification tags 480-488. In accordance with this example, identification tags 480-488 are Radio frequency identification tags.

Item identifiers 470-478 are each located in a position parallel to a mass sensor shelf below the given item identifier. For example, item identifier 470 is located above a mass sensor shelf such that item identifier 470 is parallel or horizontal to the mass sensor shelf below it. However, item identifiers 470-478 can be placed at any location within refrigerator 400 in order to receive and transmit radio frequencies to Radio frequency identification tags associated with items inside refrigerator 400. For example, item identifier 478 could be positioned on a side wall of the upper shelf inside the refrigerator compartment, on a back wall of the refrigerator compartment, or on a face of the refrigerator door.

In this illustrative embodiment, five item identifiers are depicted. However, in accordance with the illustrative embodiments, any number of item identifiers may be located within a storage unit, such as refrigerator 400. For example, an item identifier can be positioned in a location parallel to every shelf in refrigerator 400. In this example, six item identifiers are located within refrigerator 400.

In another example, two or more item identifiers can be consolidated into a single item identifier unit. For example, item identifier 470 and item identifier 472 can be consolidated into a single item identifier positioned in a location parallel to the upper shelf in the freezer compartment. This consolidated item identifier could receive and transmit radio frequencies from Radio frequency identification tags on the upper shelf and the lower shelf in the freezer compartment, as well as the upper shelf and lower shelf in the door of the freezer compartment. Thus, in this illustrative example, a single item identifier is capable of receiving and transmitting radio frequencies to Radio frequency identification tags located anywhere within the freezer compartment of refrigerator 400.

In accordance with another illustrative embodiment, an item identifier can be incorporated within the mass sensor shelf itself. In such an embodiment, the mass sensor shelf is capable of transmitting an interrogate signal to Radio frequency identification tags within an interrogate zone of the mass sensor shelf. The mass sensor shelf is also capable of receiving radio frequencies transmitted by Radio frequency identification tags within a reception range of the mass sensor shelf.

In another example, a set of item identifiers are located in a plane of a door to refrigerator 400. The set of item identifiers are activated to scan for an item entering refrigerator 400 or being removed from refrigerator 400 when a door to refrigerator 400 is opened. As used herein, a set of item identifiers includes a single item identifier, as well as two or more item identifiers. Therefore, in this example, only a single item identifier or a single pair of item identifiers are required to scan for items entering refrigerator 400.

In this example, a user is not required to manually scan identification tags at item identifiers 470-478. Item identifiers are capable of automatically sending and receiving radio frequencies to activate Radio frequency identification tags to transmit identification codes without user intervention.

Item identifiers 470-478 are automatically activated to scan for identification tags associated with items to be placed inside a storage unit, to be removed from a storage unit, or already inside a storage unit. The item identifiers are activated when a door to the storage unit is opened. In another example, item identifiers 470-478 are activated to scan for identification tags when a change in mass sensor data from a set of mass sensors occurs. In yet another alternative example, item identifiers 470-478 are activated on a periodic or cyclical basis to identify and locate items associated with identification tags 480-488.

Temperature sensors 490-496 are located in various areas of refrigerator 400. For example, temperature sensors 490-496 can be located on one or more side walls of refrigerator 400, one or more back walls of refrigerator 400, located on an inside of the door of refrigerator 400, and/or located above or below a shelf in refrigerator 400. Temperature sensors 490-496 are placed at different locations within refrigerator 400 in order to obtain temperature readings at a plurality of regions within refrigerator 400.

Temperature sensors are any type of temperature sensing device, such as a digital thermometer, mercury thermometer, and/or any other known or available device for measuring a temperature. Temperature sensors are automatically activated to obtain temperature readings and transmit readings to a control application on a periodic basis. For example, temperature readings may be taken every hour or every half hour. In another example, temperature sensors are automatically activated to obtain and transmit temperature readings in a predetermined period of time after a door to refrigerator 400 has been opened and closed. Temperature sensors are also activated to obtain and transmit temperature readings to a control application by a request from the control application.

In another embodiment, after temperature sensors obtain temperature readings, the temperature readings are stored in a database. Control application 220 retrieves the most current temperature readings from the database in order to determine an optimal placement of a given item in a storage unit, such as refrigerator 400.

In accordance with an alternative embodiment, identification tags, such as identification tags 480-488, are Universal Product Code bar codes and item identifiers, such as item identifiers 470-478, are Universal Product Code scanners. In this embodiment, a user manually scans identification tags, such as tag 480 at an item identifier, such as item identifier 478. Identification tag 480 is scanned by the user when the item is placed in the storage unit and/or removed from the storage unit. Control application determines an optimal placement for the item at the time the item is scanned by the user.

In this embodiment, only a single Universal Product Code scanner item identifier is required for a user to scan items before placement in a storage unit and/or removal of items from the storage unit. In this example, the single Universal Product Code scanner item identifier can be located on an outside face of a door of a storage unit, such as the door to the freezer compartment of refrigerator 400. A user scans each item to be placed inside refrigerator 400 at the item identifier located in the door of freezer compartment 410 prior to placing the item inside refrigerator 400. The control application provides an optimal placement for the item scanned via a user interface located in conjunction with the Universal Product Code scanner. In this manner, the process of the illustrative embodiments can identify each item as the item is scanned for placement inside refrigerator 400.

In another example, an item is identified based only on a mass footprint for the item. For example, a jar of peanut butter can be identified based on the fact that a jar of peanut butter was removed from storage unit 200, a time interval passed, and a newly detected item having the same mass footprint as the peanut butter is placed on a given mass sensor shelf. If a user places a jar of peanut butter and a carton of orange juice in refrigerator 400 at the same time, the control application will associated mass footprint data indicating a round mass footprint corresponding to a jar of peanut butter as a current mass and footprint for the peanut butter. The control application will associate mass data indicating a square mass footprint corresponding to a carton of orange juice as a current mass and footprint for the carton of orange juice. Thus, the control application can distinguish items placed refrigerator 400 simultaneously based only on mass footprint data, such as the shape of the mass footprint.

If a user places two or more items in refrigerator 400 at the same time that have similar mass footprint data, such as a jar of peanut butter and a jar of jelly, the control application will require re-identification of the items. The control application will generate an error message and/or prompt a user to indicate a location and/or an identification to re-identify each of the items that were placed in the storage unit simultaneously. This illustrative embodiment in which an item is identified based on a mass footprint rather than scanning by an item identifier could be utilized in a system including, but not limited to, item identifiers that are Universal Product Code scanners that require manual scanning of each item and/or a user interface that requires a user to manually enter an item description/item identification for each item.

In another example, refrigerator 400 does not include a set of item identifiers. In this example, a user manually enters an item identification in a user interface prior to placing the item in refrigerator 400, as the user places the item in refrigerator 400, or after the user places in item in refrigerator 400. In this example, if a user does not enter an identification for an unidentified item, a user interface associated with refrigerator 400 will prompt the user to enter an item identification via the user interface.

Although the illustrative embodiment in FIG. 4 depicts a consumer sized refrigerator, the processes of the illustrative embodiments are equally applicable to an industrial sized refrigerator, an industrial sized freezer, and/or any type of refrigeration unit utilized by a cafeteria restaurant, or other food service provider or food storage facility.

Figure 5:
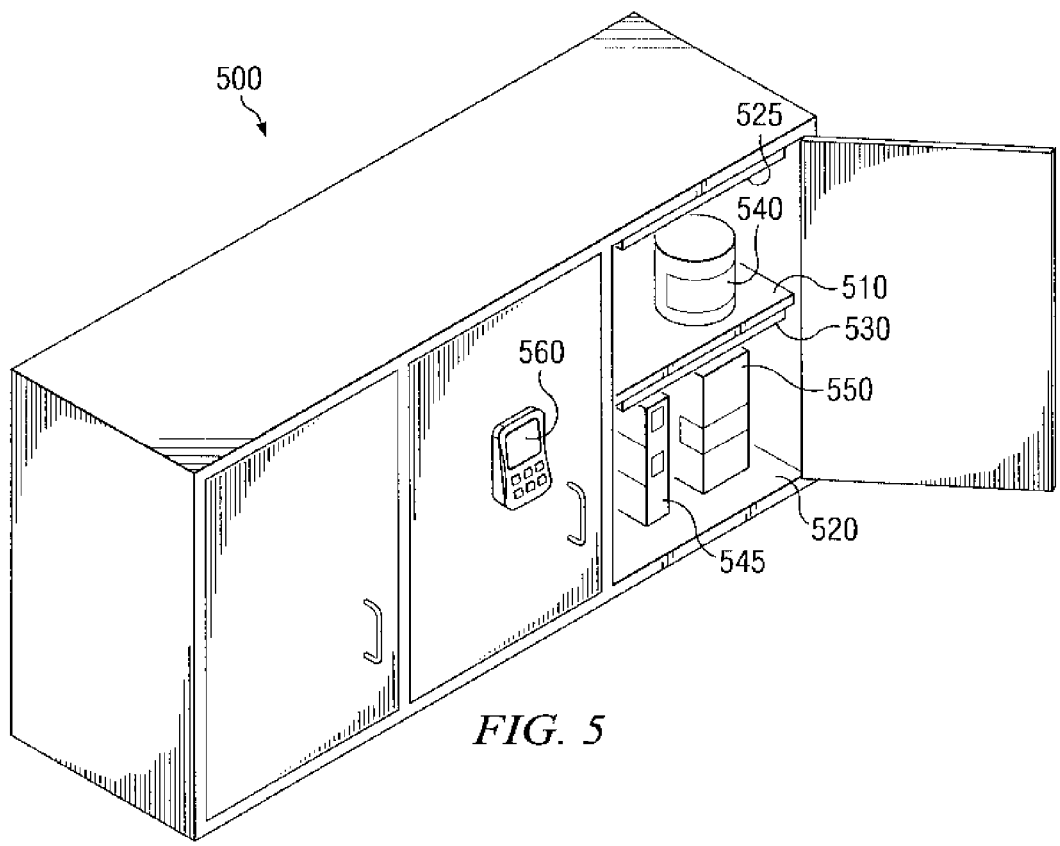
FIG. 5 is a block diagram of a cabinet including a set of mass sensor shelves and item identifiers in accordance with an illustrative embodiment.

FIG. 5 is a block diagram of a cabinet including a set of mass sensor shelves and item identifiers in accordance with an illustrative embodiment. Cabinet 500 is a storage unit, such as storage unit such as storage unit 100 and remote storage unit(s) 160 in FIG. 1 and storage unit 200 in FIG. 2.

Cabinet 500 includes a set of mass sensor shelves and a set of item identifiers. The set of mass sensor shelves includes mass sensor shelf 510 and mass sensor shelf 520.

In this illustrative example, item identifiers 523-530 are Radio frequency identification readers. Item identifiers are positioned above each mass sensor shelf. For example, item identifier 525 is located above and parallel to mass sensor shelf 510. Item identifier 530 is positioned above and parallel to mass sensor shelf 520.

Cabinet 500 includes a number of consumable items stored inside cabinet 500. In this example, each consumable item inside cabinet 500 has an identification tag, such as identification tags 540-550, associated with the item. Items associated with an identification tag can include any consumable item. For example, the items associated with identification tags 540-550 could include, but are not limited to, cereal, detergent, oatmeal, flour, plastic forks, coffee filters, salt, pet food, or any other item that is depleted through use.

In this example, item identifiers 523-530 are automatically activated to scan for items being placed inside cabinet 500 and items being removed from cabinet 500 when the cabinet door is opened.

In another example, item identifiers 523-530 are activated to scan for items placed inside cabinet 500 when a change in mass sensor data from a set of mass sensors occurs. In yet another alternative example, item identifiers 523-530 are activated on a periodic or cyclical basis to identify and locate items in cabinet 500 associated with identification tags 540-550.

Cabinet 500 also includes a control application for controlling item identifiers 523-530 and receiving mass data from the set of mass sensor shelves associated with refrigerator 100. The control application receives data from a user and provides data to a user via user interface 560 located in a face of a door of cabinet 500.

User interface 560 is a digital display and keypad that provides output to a user and accepts input from the user. The digital display is any type of display for providing information to a user in the form of characters, numbers, symbols, or letters. The display can also include a touch screen for accepting input from a user. The keypad is an input device for data entry by a user. The keypad comprises alphanumeric keys and functional keys.

Although not illustrated in the illustrative example, cabinet 500 also includes a set of temperature sensors for registering temperature variations at different areas associated with cabinet 500.

In accordance with an alternative example, item identifiers 525-530 are Universal Product Code scanners and identification tags 540-550 are Universal Product Code bar codes. In this example, a user must manually scan identification tags 540-550 at one of item identifiers 525-530 when an item associated with identification tags 540-550 are placed inside cabinet 500 and/or removed from cabinet 500.

Figure 6:
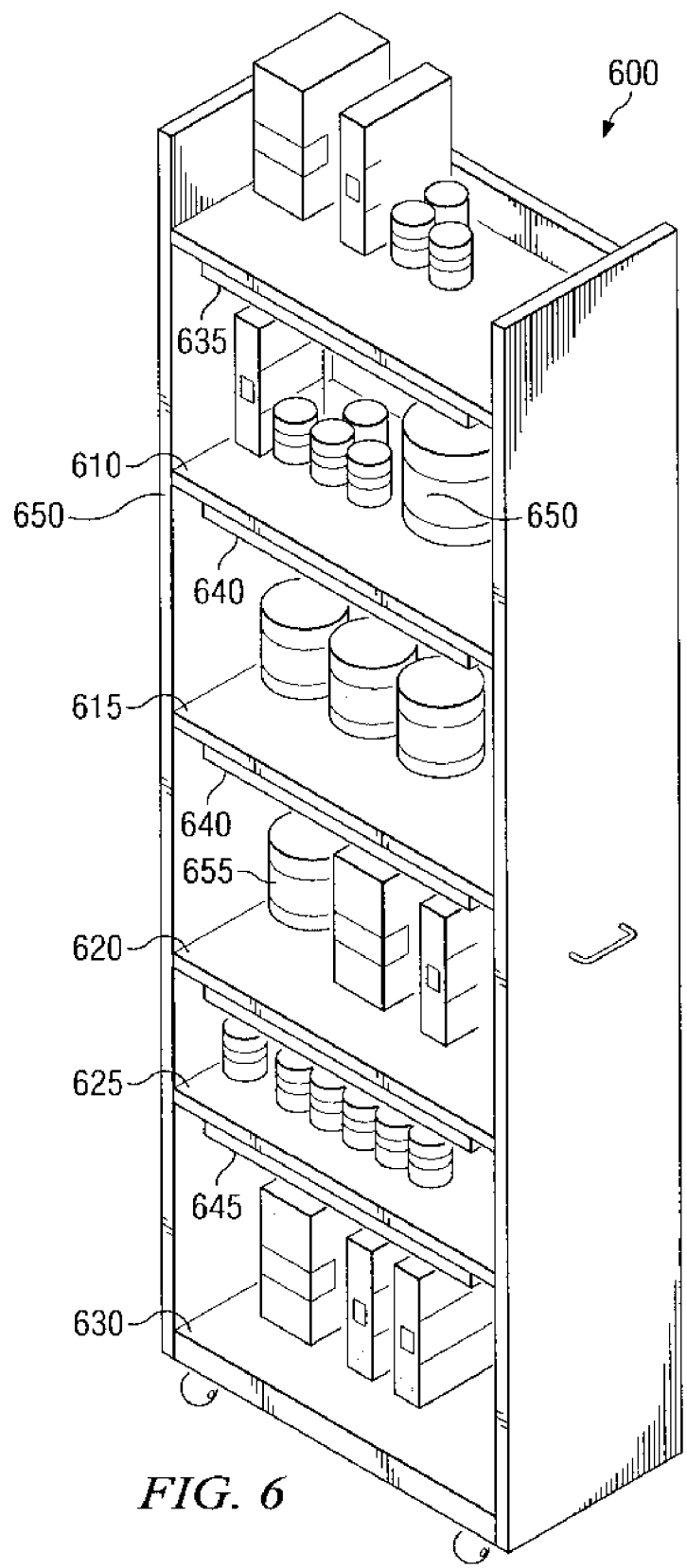
FIG. 6 is a block diagram of a set of shelves including mass sensor shelves and item identifiers in accordance with an illustrative embodiment.

FIG. 6 is a block diagram of a set of shelves including mass sensor shelves and item identifiers in accordance with an illustrative embodiment. Set of shelves 600 is a storage unit.

Set of shelves 600 includes a set of mass sensor shelves. The set of mass sensor shelves includes mass sensor shelf 610, mass sensor shelf 615, mass sensor shelf 620, mass sensor shelf 625, and mass sensor shelf 630. In this example, set of shelves 600 includes five mass sensor shelves. However, in accordance with the illustrative embodiments, set of shelves 600 can include any number of mass sensor shelves.

Set of shelves 600 also includes a set of item identifiers. The set of item identifiers includes item identifier 635, item identifier 640, and item identifier 645. Set of shelves contains consumable items. Some of the consumable items have identification tags associated with the items, such as identification tags 650-655. In this example, identification tags 650-655 are Radio frequency identification tags.

In this illustrative example, item identifiers 623-630 are Radio frequency identification readers. Item identifiers 635-645 are activated by the controller to transmit an interrogate signal. The interrogate signal is received by a set of identification tags when a change in mass sensor data from a set of mass sensors associated with a mass sensor shelf is detected. As used herein, a set of identification tags includes a single identification tag, as well as two or more identification tags.

In another example, item identifiers 635-645 are activated by a motion detection apparatus incorporated within item identifiers 635-645. The motion detection apparatus detects motion when a user places an item in set of shelves and/or removes an item from set of shelves. Upon detecting motion, the motion detection apparatus activates an item identifier associated with the motion detection apparatus.

In this example, each item identifier is located along a side wall of set of shelves 600. However, in accordance with another embodiment, an item identifier can be located anywhere in association with set of shelves 600. For example, item identifier 635 can be positioned in a location above and parallel to a mass sensor shelf below the item identifier, such as mass sensor shelf 610.

Set of shelves 600 also includes a user interface. The user interface is a digital display and keypad that provides output to a user and accepts input from the user. The user interface also includes voice recognition software, a microphone, a speaker, and a voice synthesizer for accepting verbal/audio input from a user and providing verbal/audio output to a user.

Although not illustrated in the illustrative example, set of shelves 600 also includes a set of temperature sensors for registering temperature variations at different areas associated with set of shelves 600.

Although the illustrative example does not depict a mass sensor shelf and item identifier associated with the upper most shelf of set of shelves, in another example, the upper most shelf is also a mass sensor shelf having an item identifier associated with the uppermost shelf.

In this illustrative example, set of shelves 600 is a set of shelves in a location at room temperature. In another illustrative example, set of shelves 600 is a set of shelves inside an industrial sized walk-in refrigeration unit. In such a case, the consumable items stored on set of shelves 600 can be items stored at a temperature lower than room temperature. In another example, set of shelves 600 is located in a heated room. In this example, items stored on set of shelves 600 are items stored at a temperature higher than room temperature.

In accordance with an alternative example, item identifiers 635-645 are Universal Product Code scanners and identification tags 650-655 are Universal Product Code bar codes. In this example, a user must manually scan identification tags 650-655 at one of item identifiers 635-645 when an item associated with identification tags 650-655 are placed inside set of shelves 600 and/or removed from set of shelves 600.

Those of ordinary skill in the art will appreciate that the storage units depicted in FIGS. 1-6 may vary. The depicted examples are not meant to imply architectural limitations with respect to the illustrative embodiment. For example, a storage unit in accordance with the illustrative embodiments could also include a pantry, a cupboard, a closet, a portable storage unit, or an oven. As used herein, an oven is a chamber or enclosed compartment for sterilizing, heating, warming, or cooking. An oven includes, but is not limited to, a stove, a kiln, a green house, a heated rail car, and/or a microwave oven.

Figure 7A:
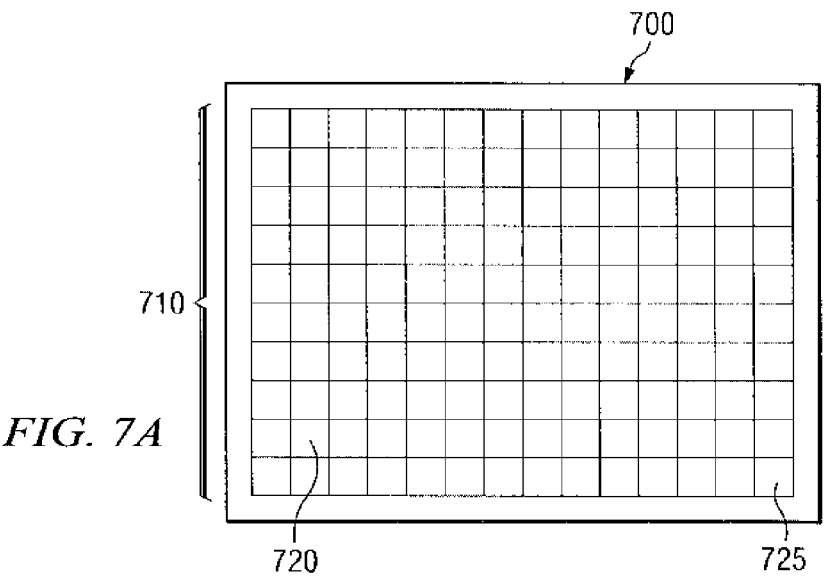
FIG. 7A is a block diagram of a mass sensor shelf having a mass sensor grid in accordance with an illustrative embodiment.

FIG. 7A is a block diagram of a mass sensor shelf having a mass sensor grid in accordance with an illustrative embodiment. Mass sensor shelf 700 is a mass sensor shelf inside a storage unit, such as refrigerator 400 in FIG. 4, cabinet 500 in FIG. 5, and set of shelves 600 in FIG. 6. Mass sensor shelf 700 has a mass sensor grid 710 spanning the entire area of an upper surface of mass sensor shelf 700. Mass sensor grid includes a plurality of mass sensors, such as mass sensor 720 and mass sensor 725.

Each block in mass sensor grid 710 represents an individual mass sensor in the plurality of mass sensors. Each sensor is separate and isolated from every other sensor in the mass sensor grid. In this illustrative example, mass sensors 720-725, are tiny mass sensors measuring one centimeter by one centimeter. In accordance with the illustrative embodiments, mass sensors can be any shape and any size mass sensors. For example, mass sensors 720-725 can measure one centimeter by two centimeters, or any other size.

Mass sensors in mass sensor grid 710 can measure a mass of an item wholly or partially placed on top of a given mass sensor. Thus, when an object is placed on a mass sensor shelf, each mass sensor covered by the object will generate mass data regarding a portion of the object. The process utilizes mass data from the set of mass sensors covered by an object on a mass sensor shelf to determine a mass of the object.

Although not depicted in the figure, one or more temperature sensors are located on a side wall of a storage unit associated with mass sensor shelf 700. In another example, one or more temperature sensors are located above mass sensor shelf. One or more temperature sensors can also be included below mass sensor shelf 700 to detect a temperature reading associated with a shelf below mass sensor shelf 700.

Figure 7B:
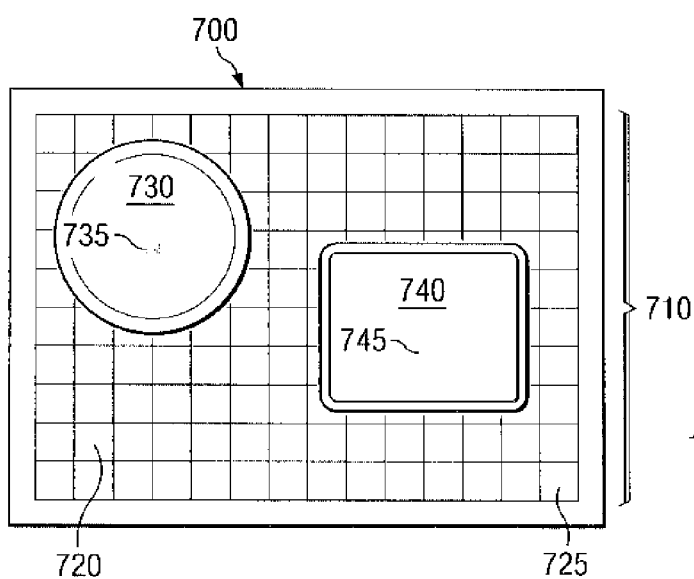
FIG. 7B is a block diagram of a mass sensor shelf having a mass sensor grid and consumable items on the shelf in accordance with an illustrative embodiment.

FIG. 7B is a block diagram of a mass sensor shelf having a mass sensor grid and consumable items on the shelf in accordance with an illustrative embodiment. Jar of peanut butter Unit 730 is located on mass sensor shelf 700. Unit 730 rests on a set of mass sensors of mass sensor grid 710. The set of mass sensors generates mass data regarding the mass of unit 730.

Unit 730 is associated with identifier tag 735. Identifier tag 735 is read by an item identifier to identify unit 730 as a jar of peanut butter.

In this example, a Tupperware of tuna salad is also located on mass sensor shelf 700. The Tupperware of tuna salad unit 740 is associated with identifier tag 745. An item identifier utilized identification data available from identifier tag 745 to identify unit 740 as a Tupperware of tuna salad. A set of mass sensors covered by unit 740 generate mass data regarding the mass of unit 740. This information is transmitted to a controller. The controller is an application that can determine a depletion of a particular item based on the data from an identification tag and mass data from the set of mass sensors.

Thus, when an object is placed on a mass sensor shelf, the object will rest on a set of mass sensors on the portion of the shelf covered by the object. Each mass sensor in the set of mass sensors transmits mass data regarding the mass of the object to a controller.

The controller creates a mass footprint for the identified item. The mass footprint is an impression of a shape of a portion of the identified item in contact with a portion of the mass sensor shelf. The portion of the mass sensor shelf in contact with the identified item is the set of mass sensors transmitting mass data regarding the mass of the identified item. In this example, Unit 730 has a mass footprint indicating a current mass of unit 730 and a shape of a surface of unit 730 in contact with mass sensor shelf 700. The shape indicated by the mass footprint is round. In this example, either the top or bottom of a jar of peanut butter is in contact with a portion of mass sensor shelf 700.

Likewise, the mass footprint for unit 740 indicates a current mass of unit 740 as well as a shape of a surface of unit 740 in contact with a portion of mass sensor shelf 700. In this example, unit 740 has a square shaped mass footprint, as a surface of the Tupperware of tuna salad in contact with mass sensor shelf 700 is square. In this case, the surface of the Tupperware of tuna salad in contact with a portion of mass sensor shelf could include a top, a bottom, or a side of a square Tupperware container.

If unit 730 and unit 740 are pressed against each other, the mass sensors in contact with unit 730 and 740 may appear to be covered by a single item. In such a case, the mass sensor data from the set of mass sensors covered by unit 730 and the set of mass sensor in contact with unit 740 may be combined by the controller to form a single mass sensor footprint. However, the controller can determine that the single mass footprint actually belongs to two items rather than one item if two response signals are received from two identification tags. For example, if one response signal is received from identification tag 735 associated with unit 730 and another response signal is received from identification tag 745 associated with unit 740, the controller will determine that the single mass sensor data is attributable to units 730 and 740.

In such a case, the controller will isolate a set of mass sensors for unit 730 based on a previous mass footprint for unit 730 and a previous mass footprint for unit 740. A previous mass footprint comprises a previous mass for a given unit as well as the shape of a surface in contact with a portion of a mass sensor shelf in a set of mass sensor shelves for the given storage unit.

In the illustrative embodiment shown in FIGS. 7A and 7B, the mass sensor shelf includes a grid array containing a mass sensor for each portion of the grid. The grid array determines a current mass for an item in contact with the grid array, as well as a mass footprint or impression of the portion of the item in contact with the grid array.

However, in another exemplary embodiment, the grid array includes a single mass sensor, rather than a plurality of mass sensors in a grid. In this example, the grid array is used only in the calculation of the mass footprint or impression of the item in contact with the shelf to create a footprint for the item. The mass of the item is determined by subtracting a previous mass for the entire shelf, including all items on the shelf, from a current mass for the entire shelf, also including all items on the shelf.

Thus, mass change is identified by placing an item on the given shelf and measuring the resultant change in total mass of the shelf. The control application correlates the change in mass with the resultant change in mass footprint data. The change in mass footprint data is due to the additional mass of the item added to the given mass sensor shelf. The change in mass is associated with a newly detected mass footprint for the item. The newly detected mass footprint and the change in mass for the entire shelf are associated with the item placed on the given mass sensor shelf when the change in mass and mass footprint data are detected.

Figure 8:
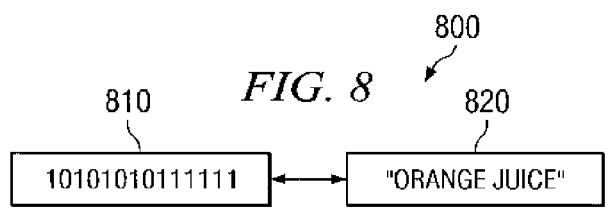
FIG. 8 is a block diagram illustrating an association of an identification code from an identifier tag with a consumable item description in accordance with an illustrative embodiment.

FIG. 8 is a block diagram illustrating an association of an identification code from an identifier tag with a consumable item description in accordance with an illustrative embodiment. Data structure 800 is an example of data stored in a database, such as local database 235 in FIG. 2 and remote database 140 in FIG. 1.

The description pair includes a machine readable identification code, such as "10101010111111" associated with identification tag 810. The pair also includes a human readable item description 820 that is associated with identification code "10101010111111" associated with identification tag 810. Other examples of identification codes include, for example, "1234564", "A", or any other code that is unique among all identification codes that a tag reader can read.

In this illustrative example, identification tag 810 having code "10101010111111" is associated with item description "orange juice" 820. An item description is a human understandable description of an item. Human understandable descriptions are for example, text, audio, graphic, or other representations suited for display or audible output.

A user interface and tag reader operates cooperatively with identification tags to identify items for placement in a storage unit and/or identify already placed inside a storage unit. Identification tags, such as identification tag 810 can be any type of identification tag, including Universal Product Code (UPC) bar code identification tags and Radio frequency identification (RFID) tags. Radio frequency identification tags include read-only identification tags and read-write identification tags.

A read-only identification tag is a tag that generates a signal in response to receiving an interrogate signal from an item identifier. A read-only identification tag does not have a memory.

A read-write identification tag is a tag that responds to write signals by writing data to a memory within the identification tag. A read-write tag can respond to interrogate signals by sending a stream of data encoded on a radio frequency carrier. The stream of data can be large enough to carry multiple identification codes.

FIG. 9 is a block diagram illustrating an interaction of a user interface and tag reader with an identification tag in accordance with an illustrative embodiment. Control unit 900 is a control unit such as control unit 200 in FIG. 2. Control unit 900 includes a user interface and item identifier(s). Control unit 900 activates an item identifier associated with a storage unit to generate an interrogate signal 910 to form an interrogation zone. Item 920 is located within the interrogation zone of the item identifier. Identification tag 930 associated with item 920 receives interrogate signal 910. In response to receiving interrogate signal 910, identification tag 930 generates response signal 940 via an antenna on the identification tag.

Control unit 900 receives response signal 940. Control unit 900 analyzes response signal 940 to identify an identification code for item 920. Control unit 900 identifies item 920 by identifying an item description, such as item description 820 in FIG. 8, in identifier database 950 associated with the identifier code for identification tag 930.

FIG. 10 is a flowchart illustrating a process for detecting a usage of a given item within a storage unit utilizing triangulation in accordance with an illustrative embodiment. In these examples, the process is implemented by control application 220 in FIG. 2.

The process identifies an item for placement in a storage unit (step 1010). The process retrieves an item profile (step 1020) for the item from a database. The process requests real-time/current temperature values for a plurality of areas in the storage unit (step 1030) to form a set of real-time temperature values.

The process retrieves the preferred storage temperature range for the item from the item profile (step 1040). The process compares the preferred storage temperature range to the set of real-time temperature values (step 1050). The process identifies the optimal placement of the item in the storage unit (step 1060) based on the comparison of real-time/current temperature values. For example, if an optimal temperature range for the item is 38-42° F. and the set of real-time temperature values indicates a temperature of 40° F. at the back right side corner of the top shelf, the process will identify the back right side corner of the top shelf as an optimal placement of the item in the storage unit. The process alerts the user regarding an optimal placement in the storage unit for the item (step 1070) with the process terminating thereafter.

Many items, such as food stuffs, require storage within a given temperature range to prevent and/or slow decay or spoilage of the items. An optimum storage temperature for items varies depending upon the type of item and the desired storage period. It is important for a user to determine an optimal temperature for storing perishable items in order to prevent/slow spoilage and decay of those perishable items and keep item fresh for longer periods of time.

Current refrigeration units permit a user to set a refrigerator and freezer compartment on a refrigeration unit to a desired temperature. However, temperature within a refrigeration unit can vary at different locations within the refrigeration unit.

Therefore, the illustrative embodiments provide a computer implemented method, apparatus, and computer usable program code for optimal placement of items in a storage unit based on temperature readings within the storage unit. In this manner, the maximum shelf life for perishable items can be realized by ensuring storage of items within an optimum temperature range for the given item.

The process identifies an item for placement in the storage unit. The process determines a preferred storage temperature for the identified item. The process then selects an optimal placement location within the storage unit for the identified item based on the preferred storage temperature and a set of temperature readings for the storage unit.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The illustrative embodiments can take the form of an entirely hardware embodiment, an entirely software embodiment or an embodiment containing both hardware and software elements. The illustrative embodiments are implemented in software, which includes but is not limited to firmware, resident software, microcode, etc.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A computer implemented method for identifying an optimal placement of an item within a storage unit, the computer implemented method comprising:
   identifying the item for placement in the storage unit to form an identified item;
   determining a preferred storage temperature range for the identified item;
   obtaining temperature readings from a plurality of temperature sensors located within the storage unit to form a set of real time temperature readings for a plurality of locations within the storage unit, wherein the plurality of temperature sensors provides data regarding a real time temperature for each of the plurality of locations within the storage unit;
   selecting an optimal placement location within the storage unit for the identified item based on the preferred storage temperature range and the set of real time temperature readings for the plurality of locations within the storage unit;
   responsive to a placement of the identified item on a mass sensor shelf in the storage unit, determining a current location of the identified item within the storage unit based on a mass footprint of the identified item, wherein the mass footprint is an impression of the identified item that is generated by a set of mass sensors in contact with a surface of the identified item on the mass sensor shelf, and wherein the set of mass sensors is a portion of a plurality of mass sensors on the mass sensor shelf; and
   storing mass sensor data from the set of mass sensors for the identified item in a storage device.

2. The computer implemented method of claim 1, wherein the storage unit is selected from a group consisting of a refrigeration unit, a freezer, an ice box, a pantry, a cupboard, and a cabinet.

3. The computer implemented method of claim 1 further comprising:
   providing an alert to a user, wherein the alert includes the optimal placement location within the storage unit.

4. The computer implemented method of claim 3, wherein the alert is presented as an alert selected from a group consisting of a graphical alert on a display screen, an auditory alert, a flashing visual alert, an LED display, a vibration alert, and a combination graphical and auditory alert.

5. The computer implemented method of claim 3, wherein the alert is an audio alert providing a text-to-voice message providing the optimal location to the user.

6. The computer implemented method of claim 3, wherein the alert is a display providing a diagram of the storage unit indicating the optimal placement location to the user.

7. The computer implemented method of claim 1, wherein the preferred storage temperature range is determined from an item profile corresponding to the identified item.

8. The computer implemented method of claim 1, wherein a set of temperature sensors from the plurality of temperature sensors is located on a shelf within the storage unit, wherein each shelf of a plurality of shelves in the storage unit comprises a different set of temperature sensors from the plurality of temperature sensors, and wherein each sensor of the set of temperature sensors provides data regarding a real time temperature for a specific location on the shelf.

9. The computer implemented method of claim 1, wherein the plurality of temperature sensors are mapped to predetermined locations on each shelf of a plurality of shelves within the storage unit.

10. The computer implemented method of claim 1, wherein identifying the item further comprises:
receiving, by a radio frequency identifier reader, a unique radio frequency identifier signal from a radio frequency identifier tag associated with the item.

11. The computer implemented method of claim 1, wherein identifying the item further comprises:
receiving, by a universal product code scanner, a universal product code identification number from a universal product code associated with the item.

12. An apparatus for identifying an optimal placement of an item within a storage unit, the apparatus comprising:
a user interface;
a tag reader;
a plurality of temperature sensors; and
a controller, wherein the controller further comprises:
a bus;
a storage device connected to the bus, wherein the storage device contains a computer usable program product; and
a processor unit, wherein the processor unit executes the computer usable program product to identify the item for placement in the storage unit to form an identified item; determine a preferred storage temperature range for the identified item; obtain temperature readings from the plurality of temperature sensors located within the storage unit to form a set of real time temperature readings for a plurality of locations within the storage unit, wherein the plurality of temperature sensors provides data regarding a real time temperature for each of the plurality of locations within the storage unit; select an optimal placement location within the storage unit for the identified item based on the preferred storage temperature range and the set of real time temperature readings for the plurality of locations within the storage unit; determine a current location of the identified item within the storage unit based on a mass footprint of the identified item responsive to a placement of the identified item on a mass sensor shelf in the storage unit, wherein the mass footprint is an impression of the identified item that is generated by a set of mass sensors in contact with the identified item on the specific shelf, and wherein the set of mass sensors is a portion of a plurality of mass sensors on the mass sensor shelf; and store mass sensor data from the set of mass sensors for the identified item in a storage device.

13. The apparatus of claim 12, wherein the storage unit is selected from a group consisting of a refrigeration unit, a freezer, an ice box, a pantry, a cupboard, and a cabinet.

14. The apparatus of claim 12 wherein the processor unit further executes the computer usable program code to provide an alert to a user, wherein the alert includes the optimal placement location within the storage unit.

15. The apparatus of claim 12 wherein the processor unit further executes the computer usable program code to:
compare a current mass footprint of a replaced item with the mass footprint of the identified item;
responsive to a determination that the current mass footprint of the replaced item does not match the mass footprint of the identified item, identify the replaced item for placement in the storage unit to form a new identified item; and
responsive to a determination that the current mass footprint of the replaced item matches the mass footprint of the identified item, determine whether a current mass of the replaced item is greater than a previous mass for the identified item;
responsive to a determination that the current mass of the replaced item is greater than the previous mass for the identified item, identify the replaced item for placement in the storage unit to form the new identified item; and
responsive to a determination that the current mass of the replaced item is not greater than the previous mass for the identified item, store the current mass of the replaced item as the current mass of the identified item.

16. The apparatus of claim 12 wherein the processor unit further executes the computer usable program code to generate an alert to a user to identify a replaced item in response to determining that a current mass of the replaced item is greater than a previous mass for the identified item.

17. A computer program product comprising:
a computer readable storage medium having computer usable program code embodied therewith for identifying an optimal placement of an item within a storage unit, the computer program product comprising:
computer usable program code configured to identify the item for placement in the storage unit to form an identified item;
computer usable program code configured to determine a preferred storage temperature for the identified item;
computer usable program code configured to obtain temperature readings from a plurality of temperature sensors located within the storage unit to form a set of real time temperature readings for a plurality of locations within the storage unit, wherein the plurality of temperature sensors provides data regarding a real time temperature for each of the plurality of locations within the storage unit;
computer usable program code configured to select an optimal placement location within the storage unit for the identified item based on the preferred storage temperature range and the set of real time temperature readings for the plurality of locations within the storage unit;
computer usable program code configured to determine a current location of the identified item within the storage unit based on a mass footprint of the identified item responsive to a placement of the identified item on a mass sensor shelf in the storage unit, wherein the mass footprint is an impression of the identified item that is generated by a set of mass sensors in contact with the identified item on the mass sensor shelf, and wherein the set of mass sensors is a portion of a plurality of mass sensors on the mass sensor shelf; and computer usable program code configured to store mass sensor data from the set of mass sensors for the identified item in a storage device.

18. The computer program product of claim 17, wherein the storage unit is selected from a group consisting of a refrigeration unit, a freezer, an ice box, a pantry, a cupboard, and a cabinet.

19. The computer implemented method of claim 1, further comprising:

monitoring temperature variations at the plurality of locations within the storage unit;

comparing a real time temperature reading corresponding to the current location of the identified item with the preferred storage temperature range of the identified item; and responsive to a determination that the real time temperature reading corresponding to the current location of the identified item is not within the preferred storage temperature range of the identified item, generate an alert to a user indicating that the identified item is not currently located in an optimal temperature location and providing a new optimal placement location within the storage unit for the identified item.

20. The computer implemented method of claim 1, further comprising:

detecting a removal of the identified item from the storage unit based on a removal of the mass footprint of the identified item on the mass sensor shelf; and storing a timestamp indicating the removal of the identified item from the storage unit.

* * * * *